Patented June 4, 1935

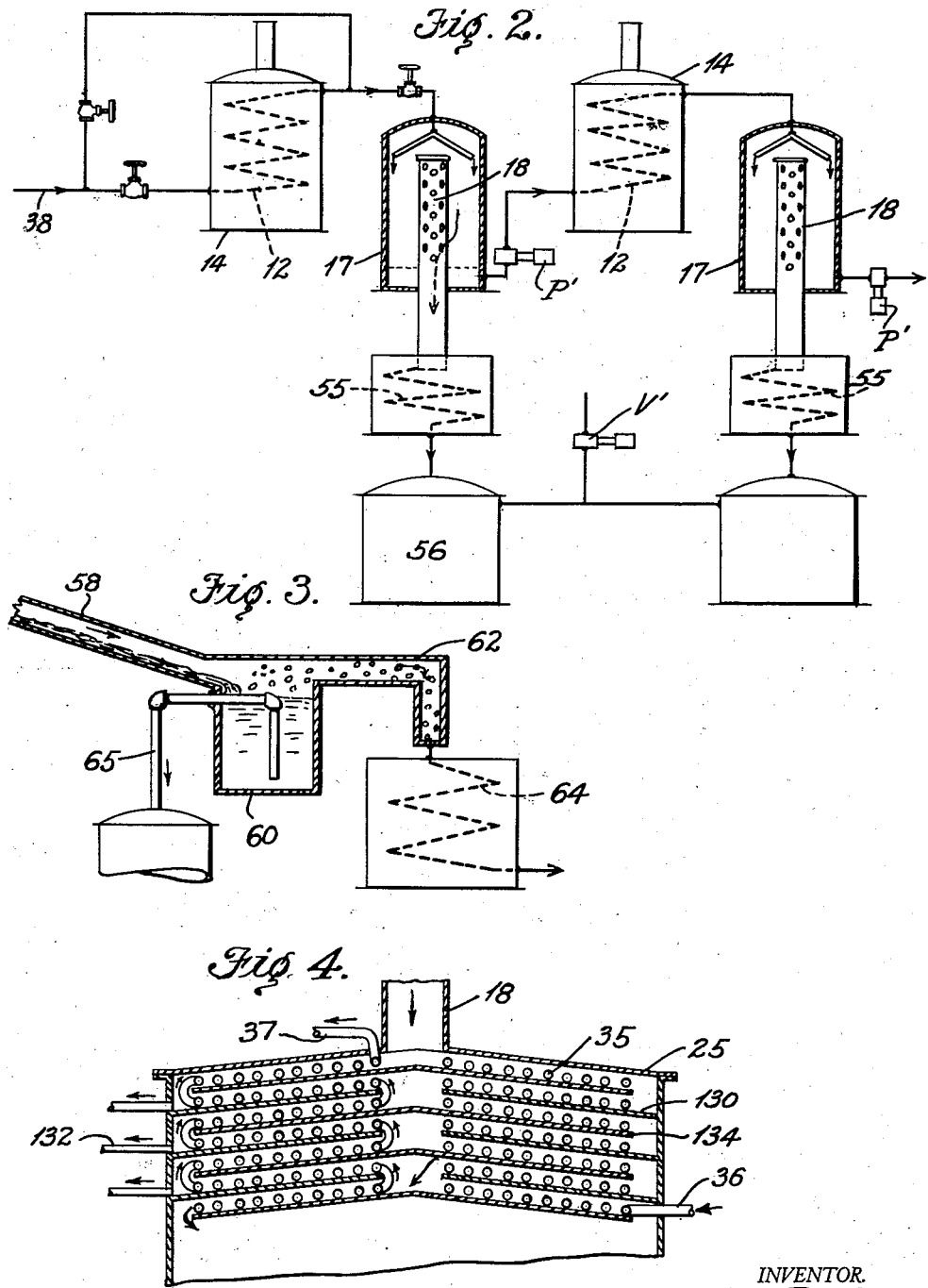

2,003,306

UNITED STATES PATENT OFFICE 2,003,306

METHOD AND APPARATUS FOR DISTILLATION

John Perl, Los Angeles, Calif.

Application October 26, 1929, Serial No. 402,651

12 Claims. (Cl. 196—94)

This invention relates to the distillation and fractional separation of volatile substances of relatively high boiling temperatures and molecular weights such as hydrocarbons, petroleum oils and the like, and is particularly adapted for such substances as suffer some decomposition at their boiling points when under normal or atmospheric pressure.

The primary objects of the invention are to carry out distillation and fractional separation at the lowest temperatures technically feasible in industrial application, to improve the separation of distillable liquids into their fractional components either by distillation with fractional condensation or by fractional distillation, to improve distillation and fractional condensation operations generally, to promote the more ready distillation of given fractional components of a material being distilled, to reduce the distillation temperatures for given components below those required under like conditions heretofore, and to facilitate distillation (fractional or otherwise) and fractional condensation under vacuum especially under high vacuum of the order of 5 or 10 mm. to 30 or 35 mm. mercury absolute pressure.

In general, these advantages are accomplished by eliminating the vapor head above the treating zones during distillation and/or fractional condensation, and by simultaneously (or individually) conducting these steps under vacuum. In distillation the vapors are taken off close to the surface of the liquid, and preferably removed downward, and in fractional condensation the vapors are passed downward through the column whereby all the heavies are removed from above the respective condensing zones, this down-draft principle thus reducing the weight or head of the vapors themselves.

In the distillation of high boiling substances, such as the high molecular hydrocarbons, it has been found that a distillation at atmospheric pressure is impossible, owing to the hydrocarbons undergoing decomposition at the boiling point, or even below. It has been known for a long time that by reducing the pressure above the liquid the distilling temperature is lowered and thus decomposition is prevented. It has also been known that at relatively high degrees of evacuation the boiling points are reduced to a great extent. The last few millimeters of mercury column absolute pressure reduction cause as much lowering of the boiling point as the removal of the first seven-eighths of the atmospheric pressure. In the distillation of very high boiling substances, therefore, the last few millimeters of absolute pressure will sometimes decide the fate of a substance preparation without decomposition. It will be apparent that, even though at low absolute pressures the weights of vapor columns will be low, still the weight of columns of substances of 300– 600 molecular weights will exert quite a pressure upon the liquid evaporative surface. It has been shown that even a few inches of vapor head makes itself felt by a distinct rise in boiling temperature in distillations under the degree of vacuum required for a cathode-ray discharge.

These difficulties I have overcome by elimination of the effects of vapor head. In distillation, the vapors are withdrawn from a point close to the liquid surface whence they are removed downward, and in fractional condensation the head effect is eliminated by passing the vapors to be condensed downward through the column from the top, the various cuts being taken off progressively from top to bottom, the uncondensed vapors and fixed gases being removed from the bottom of the column. This down-draft principle and procedure has been found to be particularly valuable when working under vacuum, especially high vacuums around 30 mm. Hg. and below.

My invention therefore may be said to reside primarily in distillation of liquids with the taking off of the vapors at substantially the liquid level and conducting them away horizontally and/or downwardly so that no vapor head will be imposed upon the liquid surface, and also in passing the vapors so distilled into the top of a condenser or fractionating column and thence downward therethrough to the bottom thereof, the condensates being taken off where desired and the uncondensed constituents being withdrawn from the bottom. In its preferred operation, the invention comprises conducting the distilling and condensing operations under vacuum, particularly high vacuum, i. e. 30 to 35 mm. Hg. down to as low as 5 or 10 mm. Hg. The invention is considered to lie in the distilling and condensing steps both individually and in combination with each other, in the various novel steps of procedure herein set forth, and in the novel features, combinations and arrangements of the parts of apparatus hereinafter disclosed as being preferred for carrying on the steps of the process.

The invention may be considered also to reside in the fractional separation of complex liquids into their fractional components by distillation and condensation with the practical elimination of all vapor head at least in the distilling operation which preferably is conducted under high vacuum, the fractionation being accomplished in either the distillation or condensation stages, that is by fractional distillation or by fractional condensation.

In the preferred form of apparatus above mentioned, an elevated still is employed in conjunction with means for maintaining a uniform liquid level therein during distillation. A vapor take-off line is provided closely adjacent the surface of the distilling liquid. In one form the take-off point may be even below portions of the evaporative surfaces. Again where a body of distilling liquid is maintained, the take-off will be at the shortest possible distance above such level, this being substantially at the level if means are present to guard against splashing of undistilled material into the vapor line. This line is of ample capacity to conduct the vapors away without appreciable friction or other retarding effects, and extends horizontally or downward, but never upward, thus imposing no vapor head on the surface of the distilling liquid. Preferably the vapor line is directed downward so as to impart such siphon effects as possible, and leads to the top of a condenser of appropriate form through which the vapors are then passed by down-draft to the bottom, the uncondensed vapors and gases being drawn from the bottom under influence of a vacuum pump or the like. Preferably this condenser is a fractionating column (except where distillation by fractional heating is relied upon for separation), and a sufficient number of trays or plates are provided for the proper recovery of the cuts desired, these being placed much closer together than in the prevailing practice in view of the absence of the reflux feature of conventional fractionating columns. The small spaces between plates reduce any tendency to dead vapor spaces and also minimize the absorption of light constituents desired in lighter cuts. Furthermore narrow spaces between plates force the vapors into rapidly moving horizontal ribbons or thin layers thereby preventing any tendency to convectional counter-currents due to progressive decrease of the specific weights of the vapors. Where required, re-boilers are employed to liberate lights and if advantageous a portion of the bottoms from the re-boilers may be returned to the column. In order to provide the desired cooling in the condenser or fractionating column, cold stock may be introduced at least into the hotter (upper) portion of the column, being passed upward through coils successively heated to higher temperatures by the vapors and assisted in its flow by the thermosiphon effect of heated liquids. However, any other cooling medium may be employed, and in particular a return of cooled liquid fractions may be employed in the lower portion of the column.

The invention resides also in such other novel steps, features of construction and operation, and arrangements and combinations of parts and steps as may be herein disclosed.

In the accompanying drawings various embodiments of the invention covering both fractional distillation and fractional condensation are shown by way of illustration. In these drawings, Fig. 1 illustrates diagrammatically and in vertical section a structure suitable for removal of the vapors being distilled under vacuum with elimination of vapor head, fractionation of the vapors being relied upon to separate the cuts, down-draft of the vapors through the column being provided, and a special type of column being employed;

Fig. 2 illustrates a method and apparatus for separation of complex liquids by fractional heating for fractional distillation;

Fig. 3 is a detail of a modification for removing vapors from a distilling liquid without vapor head; and Fig. 4 is a detail of a modified construction for the fractionating column being similar to a part of Fig. 1, and adapted especially to arrange the descending vapors in thin moving layers.

Figure 1:
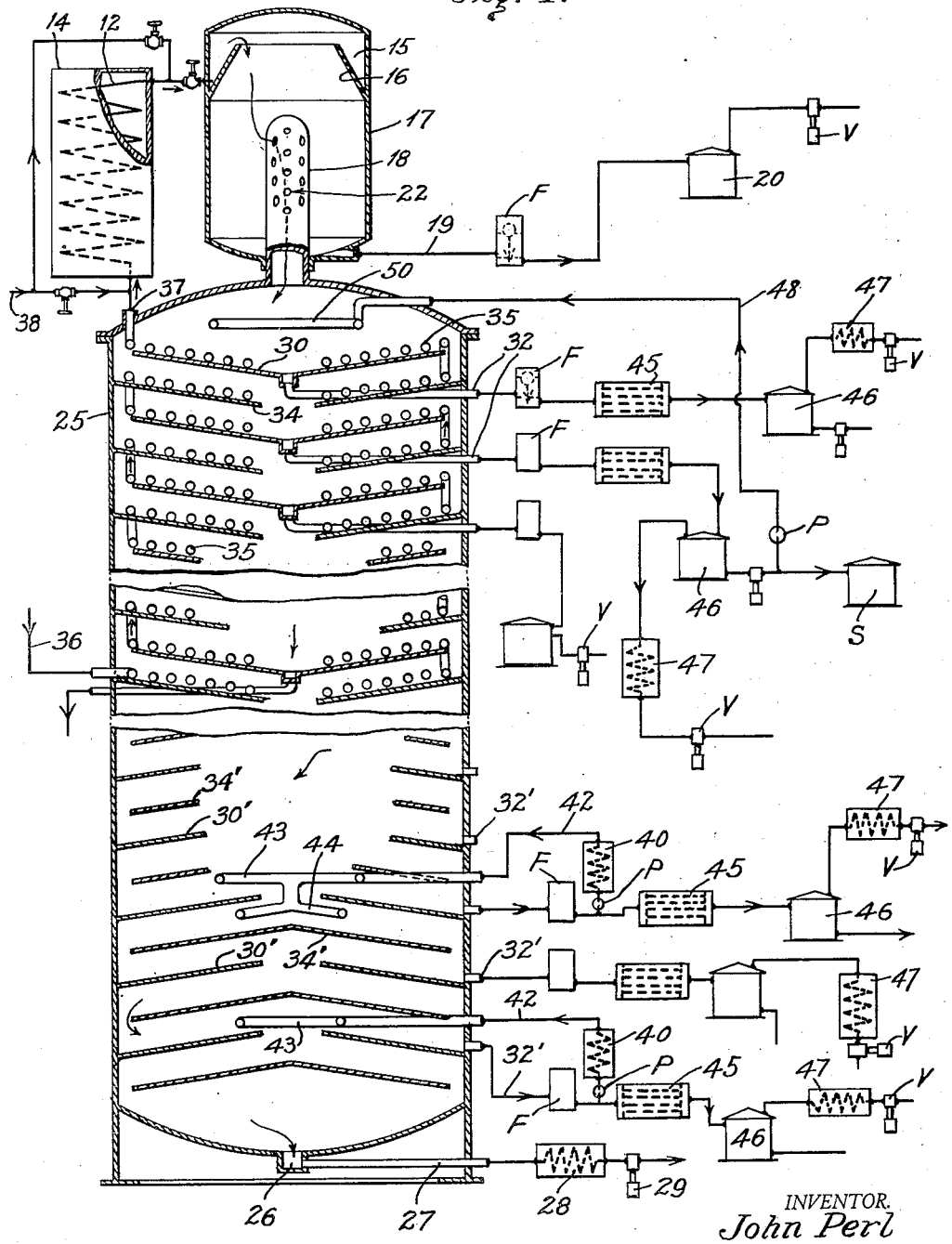

In the construction of Fig. 1, the feed material is heated to vaporizing temperature in a coil 12 or the like located for example within a furnace 14 fired in any desired manner. The heated feed is then introduced into an annular space 15 formed by a frusto-conical overflow element 16 secured in a vaporizing head or chamber 17 into the lower portion of which there projects a vertically disposed vapor take-off tube 18 whose vapor outlet is above the draw-off line 19 for the residual liquid which is conducted away to some receptacle 20 arranged to avoid interference with the vacuum maintained in the vaporizing apparatus. This portion of the system is held under vacuum as by means of a pump V and the flow of residue is controlled by a float regulation F or the like.

The vapor take-off tube 18 is capped and provided with a plurality of apertures 22 in its sides, the lowest of said apertures being positioned above the liquid level in the bottom of the head 17. The vapors so withdrawn are conducted directly downward through the bottom of head 17 into a down-draft fractionating column 25.

From the top of the fractionator 25 the vapors are led downward through the column, and all vapors which have escaped condensation in the downward travel are withdrawn through the outlet 26 at the bottom and a discharge line 27 whence they are fed to a final condenser 28 by means of a vacuum pump 29 which maintains the desired vacuum in the system and may be placed at either side of the condenser 28. In this manner the siphon effect produced by the down flow of vapors and the tendency to increase vacuum caused by condensation in the column, serve materially to assist the vacuum pump in producing the desired high vacuum condition upon the oils or other liquids undergoing distillation in the still or vaporizing head 17. Thus the downflow condensation, whether fractional or otherwise, combines and cooperates directly with the low level vapor take-off in the still 17 to produce heretofore unattained low pressure effects.

Where treating complex liquids, such as petroleum, with a single simple distillation of the liquid, it is of course desired that the condensation be fractional in order to obtain the desired cuts as products, and for this purpose an improved type of construction particularly adapted to down-draft condensation is employed in the fractionating column 25. As employed in the upper portion of the column, this construction comprises a plurality of spaced receiving trays or plates 30 for the condensates which are run off from the lowest points of the plates into take-off lines 32 under control of float regulators F. The edges of these trays or plates as shown are out of engagement with the walls of the column for the passage of vapors therearound, and in order to obtain a desirable zig-zag flow of the vapor streams open-center baffle plates 34 fitting the walls of the column are alternated between the trays. In view of the absence here of the reboiling and refluxing effects of the conventional up-draft fractionating or rectifying column, it is preferable to position the trays and baffles close together and to take off a greater number of liquid fractions than with up-draft operation. It is frequently preferable to return some of these fractions in such quantity and of such selection as will result in proper condensation and in the desired sharpness in those cuts withdrawn as the desired products, as presently to be described.

In order that proper cooling may be had about the trays 30 a series of cooling coils 35 is preferably provided upon both the trays and the baffle plates 34, these coils being arranged for the introduction of cooling liquid thereinto at the bottom of the series by inlet 36 and for its discharge in warmed or heated condition from the top of the series at the upper end of the tower through the outlet connection 37. In practice it is desired that this cooling liquid be the feed stock for the still, which stock is thus preheated and introduced from the connection 37 into the heating or distilling coil 12 in furnace 14, this feed stock if desired being mixed wth a cool feed stock from an auxiliary feed line 38.

An advantage of the upflow of the preheated liquid is found in the fact that the direction of flow of the liquid thus heated is that direction which the heated liquid naturally tends to take as a result of the thermo-siphon phenomenon. Thus in the present process I take advantage of the normal tendency of the heated liquid to rise, and of the siphon effects of the descending vapor column and the vacuum producing effects of condensation to increase or improve the vacuum in the distilling zone.

In the lower portion of the fractionating column 25, liquid cooling is preferably employed instead of the coil system. Here the condensate plates 30' and the baffle plates 34' are shown inverted with relation to the plates 30 and 34 in the upper section, the condensate draw-off lines 32' leading from the edges of the plates or trays 30'. For the liquid cooling, a portion of the condensate from certain trays 30', after leaving the float regulators F, is diverted by pumps P into coolers 40 and thence by lines 42 to suitable spray heads 43 and 44 for distribution over such of the various plates 30' and 34' as may be advantageous or desirable. Thus, in this lower section of the column, the sprayed liquids, which are suitable fractions suitably cooled, act as the condensing agents, the finally uncondensed gases and vapors leaving the bottom of the column through outlet 26 for action by the final condenser 28.

In order to effectively remove undesired light fractions from the various cuts, the condensates from both the upper and lower sections of the column are passed through reboilers 45 and then transferred to vaporizers or separators 46 wherefrom the sharply cut or stabilized liquids are withdrawn as bottoms and the light vapor fractions are drawn by vacuum pumps V through final condensers 47.

Even in the case of the upper column section, when found advantageous to initiate proper cooling and condensation on the first tray 30, or for that matter to aid condensation on any tray, a portion of any suitable liquid fraction may be returned to the column as desired. This is illustrated by the return of a portion of the second stabilized cut which is diverted on its way to the storage tank S and is moved by pump P through line 48 and sprayed over the top plate 30 through a rose 50 or the like.

As previously indicated, the down-draft fractionation herein disclosed, due to the absence of refluxing and reboiling effects within the column and in order to overcome any possibilities of setting up convection currents in the lighter vapors upon the condensation of heavier vapors, preferably should be carried on where the various plates are arranged relatively close together, a correspondingly great number of liquid fractions being removed. In order to cut down the tendency to development of such convection currents, which effect is akin to channeling, the vertical spacing between plates should not exceed about one inch of spacing per foot of column diameter. Thus in a four-foot diameter column, the spacing between adjacent plates should not exceed four inches. Of course this dimension must vary with the materials being fractionated, and in general, where working with a complex liquid such as petroleum where a considerable number of cuts are being taken, an average vertical spacing would be one-twentieth of the column diameter, rather than one foot, and in some instances it might be necessary to employ a ratio as high as one to thirty or one to thirty-five. In Fig. 4, this condition is best illustrated, the spacing of the condensate-receiving plates or trays 130 from the baffle plates 134 being about one-thirtieth of the diameter of the column, and the cooling coils 35 being arranged therebetween to insure runoff of the desired condensed fractions from the discharge lines 132. Here, as in Fig. 1, the cooling liquid enters the lower end of the coil series at 36 and is delivered from the upper connection 37 in preheated condition, ready to be passed to the heater 12 if stock is employed as the cooling medium.

While it is probable that preferable practice and apparatus are represented in Figs. 1 and 4, the range of the invention extends however to fractional distillation with straight condensation of the respective fractions, as indicated in Fig. 2. Here a plurality of the heating coils 12 and stills or vaporizing heads 17 are arranged in series, the bottoms from one still being conducted by pumps P' to the next at a higher temperature and/or under a higher vacuum for the recovery of a heavier fraction. In each instance the vapors are drawn downward through the vapor take-off tube 18 by way of the apertures 22, whence they are conducted respectively to final condenser coils 55 or the like and to storage receivers 56, the whole being maintained under vacuum as by means of pump V'.

Another method of removing the vapors from the vaporizing element in such manner as to eliminate substantially all vapor head, is illustrated in Fig. 3, where the oil from the heating coil is flowed through a pipe 58 to a tank 60 wherein a vacuum is maintained, the vapors being immediately withdrawn from a point slightly above the liquid level through outlet pipe 62 and thence passed downwardly through a final condenser 64 to storage. Any suitable means such as a trapped overflow 65 may be made to serve for maintaining both the liquid level and the vacuum in the tank 60.

Thus, by the means and in the manners indicated, it will be seen that fractionation of complex liquids such as petroleum may be accomplished with distillation and condensation, with or without vacuum, under much improved conditions, the pressure effects of all vapor head being eliminated, the vapors in fact being employed to enhance the vacuum effects.

In cases where high molecular weight substances are being distilled, such as the last fractions coming over in coking distillations, the removal of the vapors adjacent or below the distilling surface has considerable value even in the absence of vacuum.

It is evident that the distillation process is capable of being modified by one or more distillation aids or steps which in themselves are well known in the conventional up-current vapor flow distillations. Such steps or aids may be the injection or admixture of substances of different boiling point, or the admixture of gases and vapors external and foreign to the substance under distillation. These aids are for the purpose of further increasing the volatility of the substances under distillation, or forming poly-phase systems for changing aezotropic mixtures of minimum or maximum boiling points. It is furthermore within the scope of the invention to combine the down-draft distillation and fractionation with other operations often connected with conventional distillation evaporation, and fractionation processes, such as, for example: passing the vapors during their travel over solutions or through solids for partial absorption, purification, or chemical reaction. The passage through adsorbents, desulfurizing substances, deodorizing mediums or decolorizing mediums is especially mentioned as one of the examples of operations often combined with distillations. I do not claim these last named operations broadly as my invention but merely indicate the possibility of their use in connection with my down-draft distillation and fractionation principle. As to the materials under distillation I have previously mentioned prominently such substances as hydrocarbon liquids, but I wish it understood that even volatilizable solids come within the range of my invention. Metals such as mercury and zinc may be advantageously distilled by my process. This shows one of the other extremes of amenable substances.

I claim:

1. A method for the fractional separation of petroleum by distillation with elimination of vapor head, comprising providing a distilling body of the petroleum stock, withdrawing vapors from the distilling liquid at a point at least as low as approximately the surface thereof to eliminate substantially all vapor head from the distilling surface, continuing the vapors in a path at least as low as said point to maintain said elimination of vapor head, and removing the products of vaporization from the system at points at least as low as said point of withdrawal.

2. A method for the fractional separation of complex petroleum fractions with elimination of vapor head, comprising heating the petroleum liquid to a distilling temperature, supplying the heated petroleum to a distilling zone and establishing a distilling surface of said liquid, continuously withdrawing vapors downward from said zone to eliminate substantially all vapor head upon the surface, and removing the withdrawn products of vaporization from the system below said distilling zone to continue said elimination of vapor head.

3. A method according to claim 2 wherein the distillation is conducted under high vacuum for further reduction of pressure upon the distilling surface.

4. A method according to claim 2 and the further step of fractionally condensing the vapors during their downward travel from the distilling zone to accomplish further reduction of pressure upon the distilling surface, the uncondensed vapors being continued downward to a point of removal from the system.

5. A method according to claim 2 and the additional step of fractionally condensing the vapors during their downward travel from the distilling zone, the uncondensed vapors being continued downward to the point of removal from the system and both distillation and condensation being effected under high vacuum.

6. A method for the fractional condensation of petroleum fractions comprising passing petroleum vapors downward through a fractionating column provided with a series of condensing zones, continuously conducting uncondensed vapors downward from zone to zone to eliminate vapor head upon the condensed liquid surface in each zone, and removing uncondensed vapors from the bottom of the column.

7. A method for the fractional separation of petroleum stocks comprising heating the stock in an elongated restricted stream to a distilling temperature, discharging the heated stock into a pool thereof near the upper portion of an enlarged distilling zone, overflowing the stock from said pool to a lower portion of the distilling zone and causing vapors to emanate in the liquid in said pool and during said overflow, withdrawing the vapors downward from approximately the level of the distilling surfaces, to eliminate substantially all vapor head upon the distilling surfaces, continuing the vapors downward and removing the products of vaporization from the lower end of the zone.

8. A method according to claim 7 wherein the distillation is effected under high vacuum.

9. A method according to claim 7 and the further step of fractionally condensing the vapors during their downward travel from the distilling zone to accomplish further reduction of pressure upon the distilling surface, the uncondensed vapors being continued downward to a point of removal from the system.

10. A method according to claim 7 and the further step of passing the downwardly moving vapors through a fractional condensing column to maintain elimination of vapor head upon the distilling surface, withdrawing products of condensation, and withdrawing uncondensed vapors from the bottom of the condensing column to reduce vapor head upon the condensate surface, the distillation and condensation being conducted under high vacuum.

11. Apparatus for distilling complex petroleum fractions with elimination of vapor head, comprising means for heating a petroleum stock to distilling temperature, means providing an enlarged zone to receive the heated liquid, means near the upper portion of said zone for maintaining the received heated liquid in a pool and for causing overflow thereof from the pool to the bottom of said zone, means for withdrawing unvaporized liquid from the bottom of said zone, and means for withdrawing vapors from the surface of the pool, from the overflowing liquid and from the zone through the bottom thereof to maintain said elimination of vapor head.

12. Apparatus according to claim 11 including fractional condensing means through which the vapors are passed in their downward travel, said fractional condensing means including means at its lower end for withdrawing uncondensed vapors from the system whereby vapor head upon the surfaces of the condensates is reduced.

JOHN PERL.